Dec. 17, 1946.  J. B. WHITTED  2,412,850
ELECTRIC WINDSHIELD WIPER
Filed Oct. 28, 1942  5 Sheets-Sheet 1
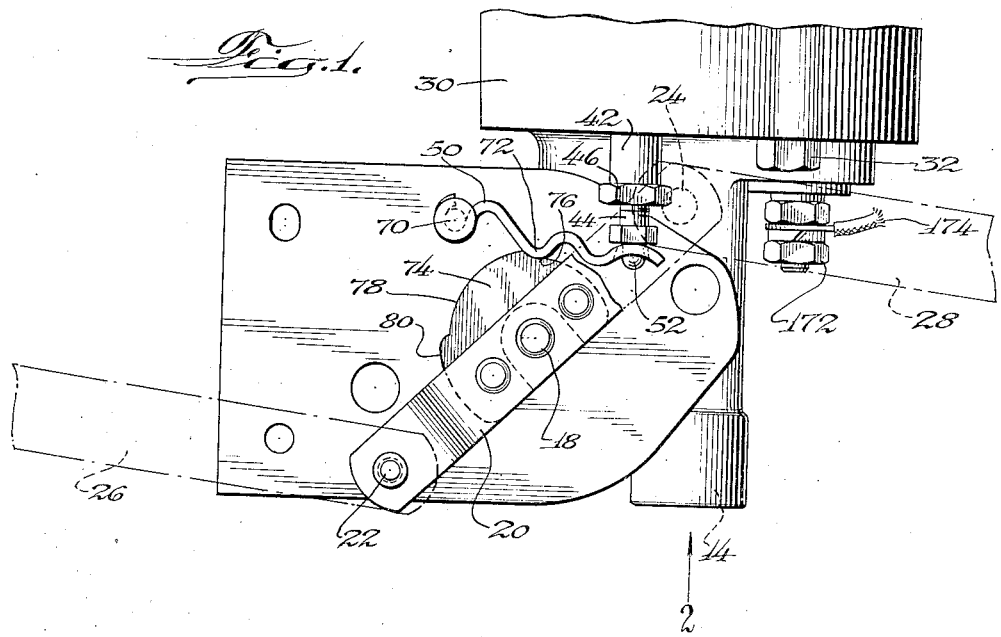
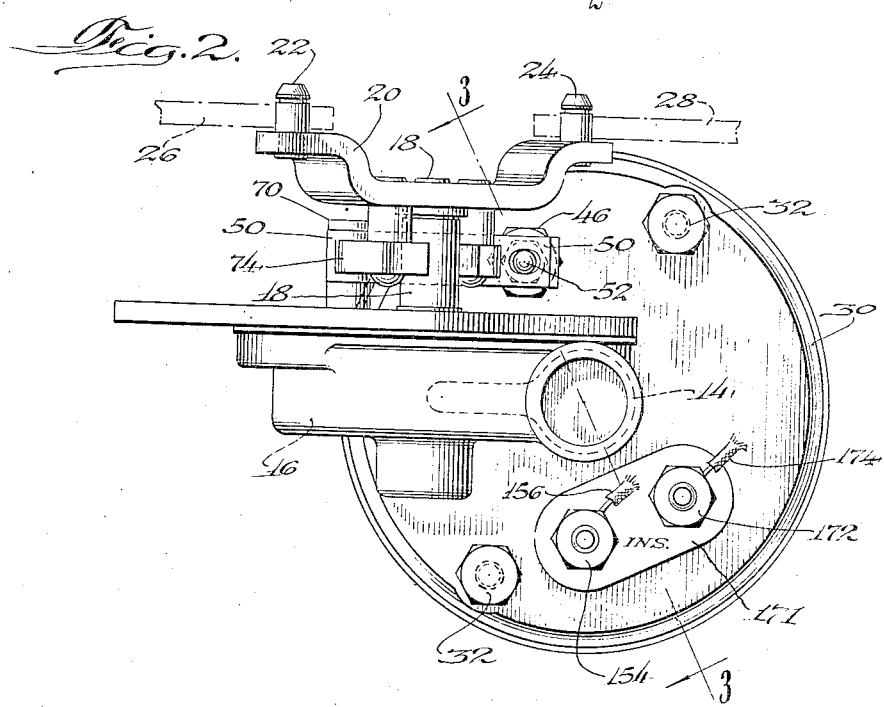
Inventor:
John B. Whitted
By Williams, Bradbury & Henke
Attorneys

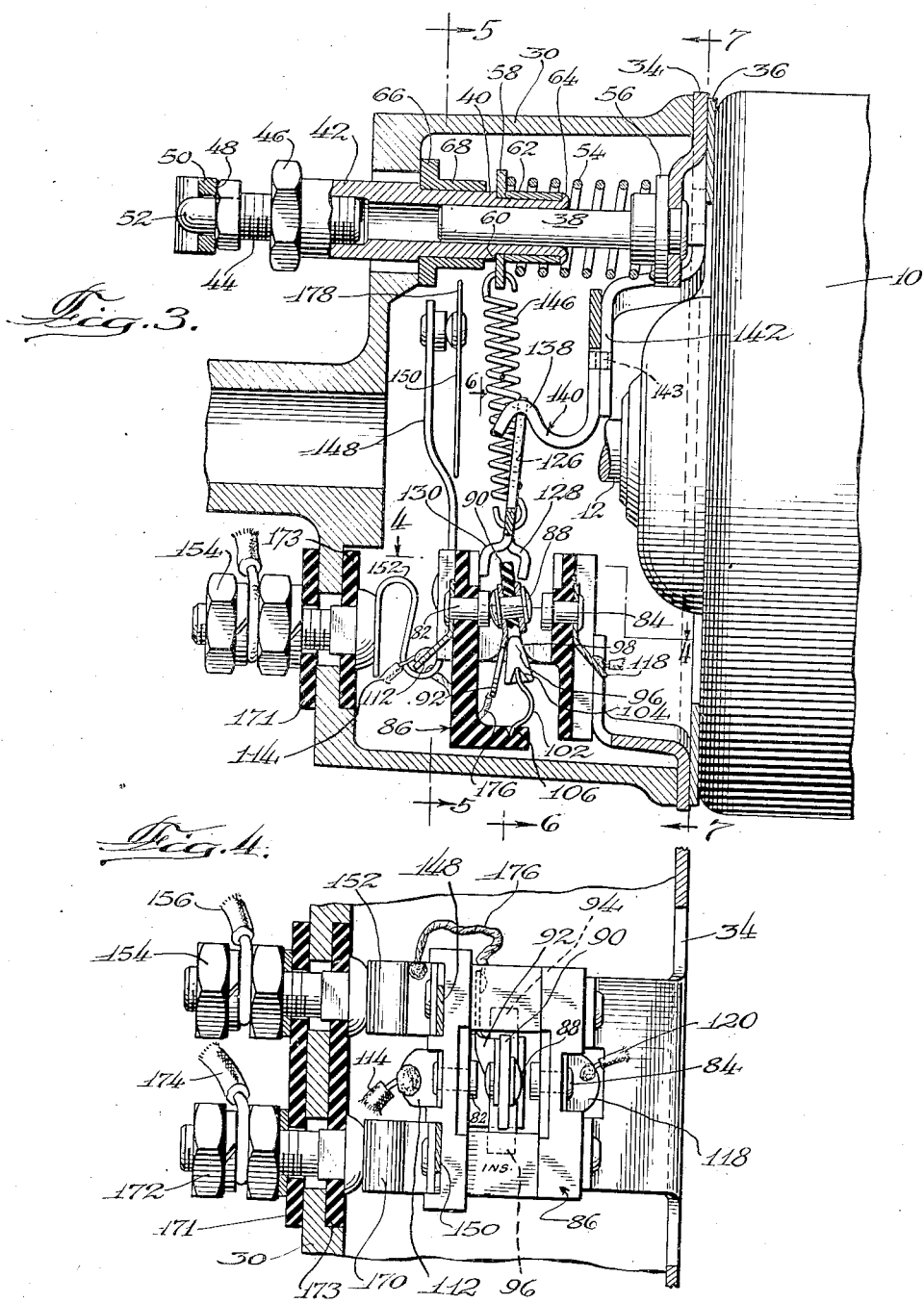

Dec. 17, 1946.
J. B. WHITTED
2,412,850
ELECTRIC WINDSHIELD WIPER
Filed Oct. 28, 1942
5 Sheets-Sheet 3
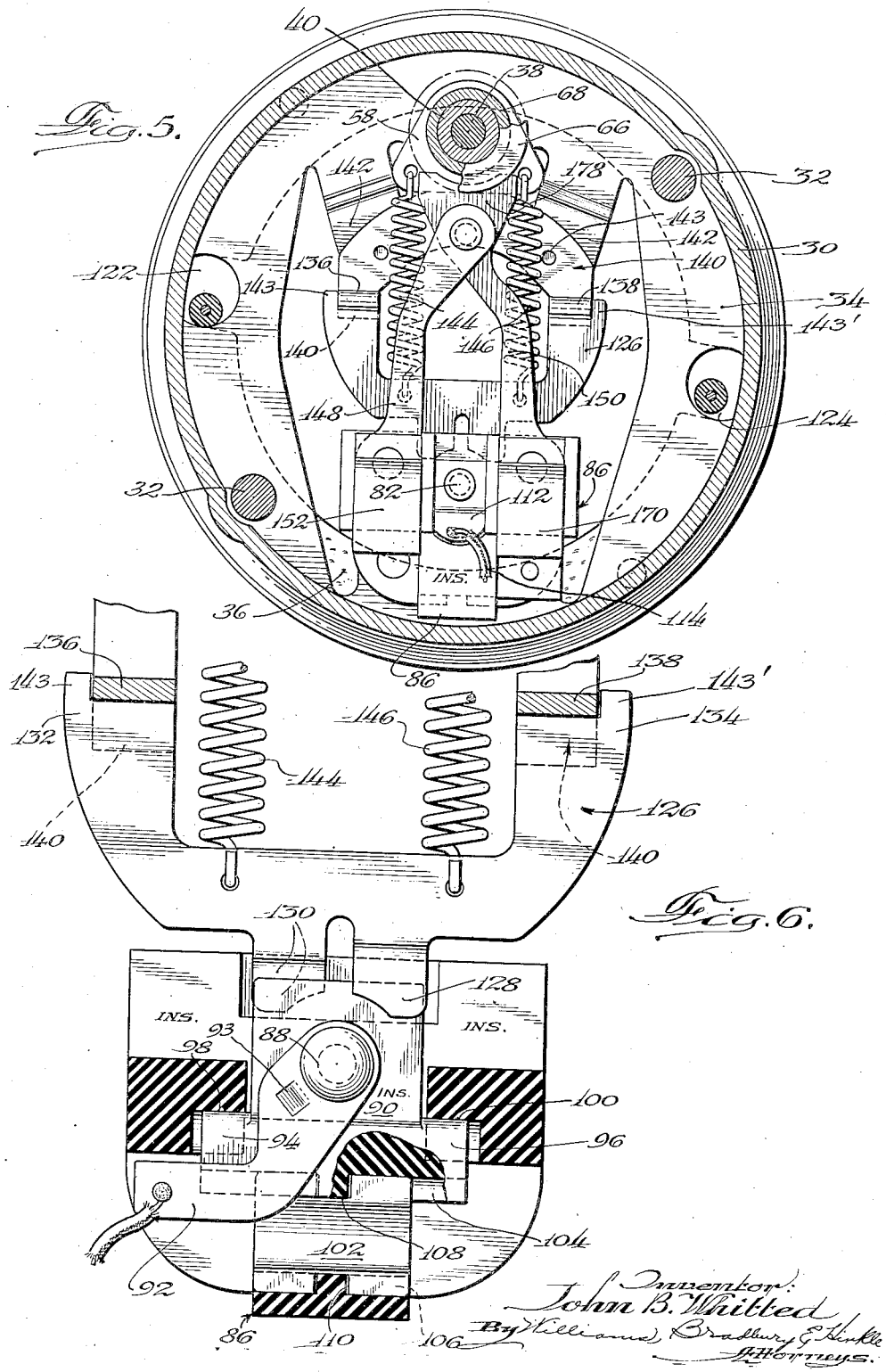

Dec. 17, 1946.                J. B. WHITTED                2,412,850
                         ELECTRIC WINDSHIELD WIPER
                         Filed Oct. 28, 1942            5 Sheets-Sheet 4
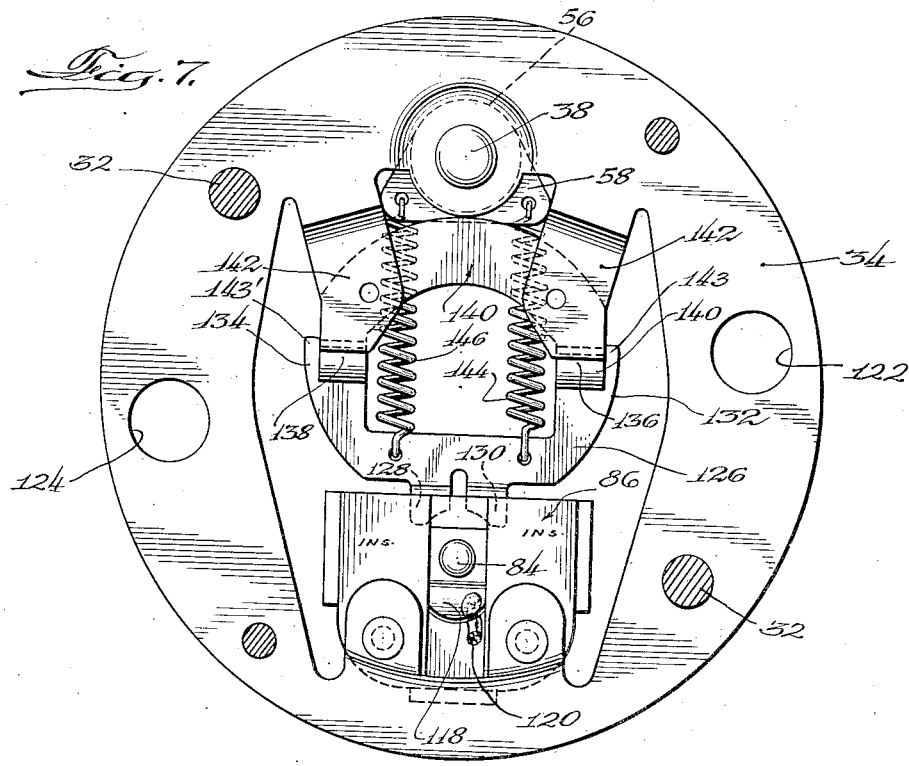
Inventor:
John B. Whitted
By Williams, Bradbury & Hinkle
Attorneys.

Dec. 17, 1946.　　　　J. B. WHITTED　　　　2,412,850
ELECTRIC WINDSHIELD WIPER
Filed Oct. 28, 1942　　　　5 Sheets-Sheet 5
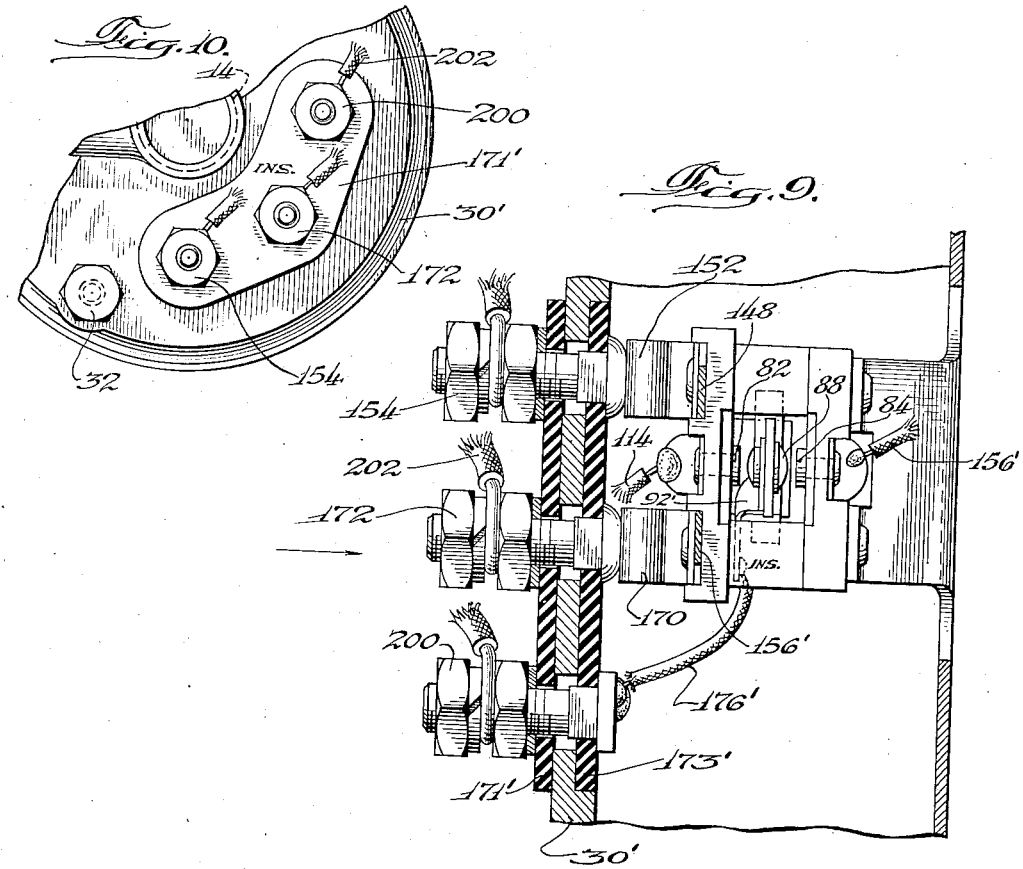
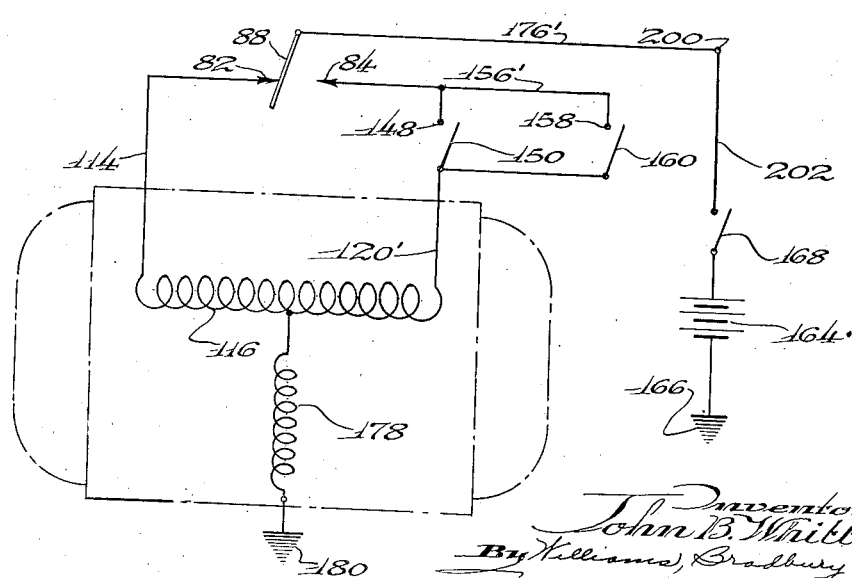
Inventor:
John B. Whitted
By Williams, Bradbury & Hinkle
Attorneys.

Patented Dec. 17, 1946

2,412,850

UNITED STATES PATENT OFFICE 2,412,850

ELECTRIC WINDSHIELD WIPER

John B. Whitted, Evanston, Ill., assignor to Stewart-Warner Corporation, Chicago, Ill., a corporation of Virginia Application October 28, 1942, Serial No. 463,616

9 Claims. (Cl. 15—253)

My invention relates to an electric windshield wiper and is in the nature of an improvement on the electric windshield wiper disclosed and claimed in my co-pending patent application, Serial No. 422,479, filed December 11, 1941, now Patent 2,370,101.

An object of my invention is to provide a new and improved, low cost, electric windshield wiper wherein the wiper blades are automatically moved to parking position beyond the normal range of movement of the wiper blades.

Another object of my invention is to provide an electric windshield wiper wherein the direction of operation of the wiper blades is reversed by reversing the electric motor which drives these blades and wherein improved means is provided to prevent the wiper blades from coming to a stop during the reversing operation.

Another object of my invention is to provide a new and improved electric windshield wiper having novel control means which can be made from a relatively few simple parts and which will give long and trouble-free use.

Another object of my invention is to provide an electric windshield wiper having a new and improved circuit arrangement for controlling the operation of the motor.

Another object of my invention is to provide an electric windshield wiper having a reversible electric motor and including a new and improved reversing switch mechanism therefor.

Another object of my invention is to provide a new and improved electric windshield wiper which is simple in operation and which includes compact control mechanism permitting the wiper to be utilized in the space available in a conventional passenger automobile.

Other objects and advantages will become apparent as the description proceeds.

In the drawings:

Fig. 1 is a plan view showing a side elevation of the control mechanism and associated parts of an electric windshield wiper embodying my invention;

Fig. 2 is an end view of the structure shown in Fig. 1 and is taken looking in the direction of the arrow 2 of Fig. 1;

Fig. 3 is a partial, sectional view taken on the line 3—3 of Fig. 2;

Fig. 4 is a partial, sectional view taken on the line 4—4 of Fig. 3, but showing a movable contact in midposition;

Fig. 5 is a sectional view taken on the line 5—5 of Fig. 3;

Fig. 6 is a partial, sectional view taken on the irregular line 6—6 of Fig. 3;

Fig. 7 is a sectional view taken on the line 7—7 of Fig. 3;

Fig. 8 is a wiring diagram;

Fig. 9 is a partial, sectional view similar to Fig. 4, but showing a modified form of my invention;

Fig. 10 is an end view of the structure shown in Fig. 9 and is taken looking in the direction of the arrow in Fig. 9; and Fig. 11 is a wiring diagram of the modification shown in Figs. 9 and 10.

The embodiment of my invention which is illustrated in Figs. 1 to 8, inclusive, of the drawings is illustrated as comprising an electric windshield wiper having an electric motor 10 driving a shaft 12 which may be either the motor armature shaft or an extension thereof. A worm 14 is mounted on the shaft 12 and drives a worm gear 16 attached to a second shaft 18. A crank 20 is attached to one end of the shaft 18 and is provided with pins 22 and 24 forming pivotal driving connections between the opposite ends of the crank 20 and links 26 and 28, which operate the wiper blades. These wiper blades and the connections between these blades and the links 26 and 28 are not shown, but may be the same as those shown in my co-pending application, or of any other suitable design.

The motor 10 is of the reversible type and the switch mechanism for reversing the direction of rotation of the motor 10 is enclosed in a housing 30 secured to one end of the motor casing by bolts 32, or in any other suitable manner. A supporting frame 34 of sheet metal, or other suitable material, and a dust excluding gasket 36 are clamped between the housing 30 and the motor casing.

A stud 38 is attached to the frame 34 and forms a support and guide for a reciprocable tube 40. The end 42 of the tube 40 is threaded to receive the threaded end of a stud 44. The stud 44 may be adjusted relative to the tube 40 and is locked in adjusted position by a nut 46. The stud 44 has a shoulder 48 adapted to engage an actuating lever 50 and the rounded end 52 of the stud 44 projects through a slot in the actuating lever 50 and constitutes a guide for this lever.

The tube 40, stud 44 and actuating lever 50 are urged to the left by a coil spring 54 confined between the base portion 56 of the stud 38 and a washer 58. The washer 58 is confined between a shoulder 60 provided by tube 40 and a sleeve 62 which surrounds the reduced righthand end of the tube 40 and is secured in place by the turned over end 64 of this tube. Movement of the tube 40 under the influence of spring 54 is limited by a flange 66 on a sleeve 68 which is press fitted, or otherwise rigidly secured to the tube 40. The flange 66 engages a portion of the housing 30, as shown in Fig. 3, to limit outward movement of the tube 40 by spring 54.

As best shown in Fig. 1, the lever 50 is formed of sheet metal or other suitable material and is pivotally mounted on a pin 70. The lever 50 has a cam engaging portion 72 which is engaged by a cam 74 mounted on the shaft 18. The cam has a low portion 76, an intermediate portion 78, and a high portion 80, which determines different positions of the lever 50 and tube 40.

The cam 74 acting through lever 50, stud 44 and tube 40, controls the switch which reverses the electrical connections of the motor 10. This switch includes a pair of stationary contacts 82 and 84 mounted in a molded insulator 86 of plastic or other suitable material. This insulator is rigidly attached to the frame 34. The stationary contacts 82 and 84 are adapted to be alternately engaged by a movable contact 88 of silver or other suitable material. This contact 88 is illustrated as being in the form of a rivet mounted in an insulating block 90 and serving to clamp an electrical terminal 92 against one face of this block. An inwardly bent tongue 93 of the terminal 92 extends into a recess in the block 90 and prevents rotation of terminal 92 about contact 88.

The insulating block 90 has laterally extending arms 94 and 96 (Fig. 6) which have rounded upper edges resting in generally V-shaped recesses 98 and 100 to provide a pivotal mounting for the block 90. A leaf spring 102 has its upper edge located in a slot 104 in the lower edge of the block 90 and this spring has its lower edge located in a slot 106 formed in the insulator 86. The upper and lower edges of the spring 102 are interrupted by recesses 108 and 110 and the block 90 and insulator 86 have integral tongues which project into these recesses to prevent lateral displacement of the spring 102 and block 90 relative to each other and also relative to the insulator 86.

In Fig. 3, the movable contact 88 is illustrated as being in engagement with the stationary contact 82. This figure clearly shows that the spring 102 exerts a force which causes the block 90 to pivot in a counter-clockwise direction about its pivotal engagement with the insulator 86, and thereby presses the movable contact 88 into firm engagement with the stationary contact 82. This prevents accidental separation of these contacts and is particularly important in that an appreciable force must be exerted on the block 90 to shift the movable contact out of engagement with the stationary contact. When the movable contact 88 engages the stationary contact 84, a similar condition obtains.

The stationary contact 82 is in the form of a rivet which clamps a bent metal plate 112 to a wall of the insulator 86. One end of a conductor 114 is soldered or otherwise attached to the plate 112 and serves to connect this plate with one end of the motor field coil 116 (Fig. 8). The fixed contact 84 is also in the form of a rivet which clamps a bent metal plate 118 to a second wall of the insulator 86. A conductor 120 connects the plate 118 with the opposite end of the coil 116. The conductors 114 and 120 pass from the interior of the housing 30 to the interior of the motor casing 10 through openings 122 and 124, respectively, formed in the plate or frame 34, washer 36 and the adjacent end of the motor casing.

I shall now describe the means for shifting the position of the movable contact 88 to reverse the direction of rotation of the motor and the direction of oscillation of the wiper blades. This means comprises a movable yoke 126, preferably formed of sheet metal and having space end portions 128 and 130 located on opposite sides of the upper end of the block 90. The upper ends 132 and 134 of the yoke 126 are located in the V-shaped slots provided by the reversely bent ends 136 and 138 of a stationary yoke 140 which is riveted or welded to an offset portion 142 of the plate or frame 34. The yoke 140 has partly punched out portions 141 which project into holes in offset portion 142 and center this yoke thereon. The upper ends of the yoke 126 are provided with fingers 143 and 143' which prevent lateral displacement of this yoke relative to the yoke 140. A pair of coiled springs 144 and 146 have their lower ends attached to the yoke 126 and their upper ends attached to the washer 58 on the slidable tube 40 in such manner that movement of this tube to the right, as viewed in Fig. 3, will cause these coil springs to move the forked lower end of yoke 126 to the right and shift the movable contact 88 from engagement with the stationary contact 82 into engagement with the stationary contact 84.

I have provided an automatic parking switch which maintains the motor 10 in electrical communication with its source of energy independently of the manual control for starting and stopping the windshield wiper. This automatic switch prevents the motor from being disconnected from its source of current except when the movable parts of the wiper mechanism are in such position that the inertia of these parts will carry the windshield wiper blades beyond their normal range of movement and into parking position. This automatic switch comprises a stationary contact 148, having its lower end riveted or otherwise attached to the insulator 86, and a movable contact 150, having its lower end attached to the insulator 86 in spaced relation to the lower end of the contact 148. An S-shaped spring 152 connects stationary contact 148 with a terminal 154 connected by conductor 156 to the stationary contact 158 (Fig. 8) of a manual switch located on the instrument board of an automobile, or in any other suitable position. The movable contact 160 is adapted to be manually controlled to start and stop the windshield wiper and is connected by a conductor 162 to the positive terminal of the automobile battery 164. The negative terminal of the battery 164 is grounded, as indicated at 166. It is usual to connect the windshield wiper to the automobile battery through the manually controlled ignition switch 168 and I have illustrated my novel windshield wiper as being so connected, although the windshield wiper may be connected directly to the battery 164, if desired.

A second S-shaped spring 170 connects the automatic switch contact 150 with a second terminal 172 which is connected by conductor 174 to the ignition switch 168 and battery 164. A conductor 176, arranged in the form of a wire pigtail, connects spring 152 with the metal plate 92 attached to the movable contact 88 of the reversing switch. The terminals 154 and 172 are mounted in insulating strips 171 and 173 and a square section of each terminal is located in a square hole in the latter strip to prevent rotation of the terminals. The strip 173 is positioned in a suitable recess formed in the housing 30.

The movable contact 150 of the automatic parking switch has an upper end 178 which projects into the path of movement of the flange 66, as clearly shown in Fig. 3. When the tube 42 is moved to its extreme right-hand position by the lever 50 and cam 74, movable contact 150 is moved out of engagement with stationary contact 148. This has no effect on the operation of the windshield wiper when the manual switch is closed, since the automatic parking switch is in parallel with the manual wiper control switch. When the manual switch has been moved to open position, however, opening of the automatic parking switch disconnects the motor 10 from its source of power and prevents the direction of rotation of this motor from being reversed by the shifting of the movable contact 88 of the reversing switch. The motor, armature, and driving connections have sufficient momentum to move the wiper blades beyond their normal range of movement and into parking position.

The wiring diagram of Fig. 8 illustrates a preferred arrangement of the electrical circuits for effecting the desired mode of operation. In this diagram the motor armature coil 178 has one end connected to the center of the motor field coil 116 and a second end grounded, as indicated at 180, such ground being ordinarily effected by connecting this end of the armature coil to the motor casing. The dot and dash line in this figure encloses those parts of the electrical circuits which are within the motor casing. In this diagram, no attempt has been made accurately to reflect the relative lengths of the various circuits or relative positions of the various elements of these circuits. This diagram is purely schematic and illustrates one of several circuit arrangements capable of accomplishing the same result.

When the windshield wiper is not in use, the manual switch comprising the switch contacts 158 and 160 is in open position and the automatic parking switch comprising the contacts 148 and 150 is likewise in open position. The high part 80 of the cam 74 is in engagement with the lever 72 and the tube 40 is in its farthest right-hand position as viewed in Fig. 3. In this position of the tube, the flange 66 engages the upper end of the movable contact 150 and flexes this contact out of engagement with the stationary contact 148. The annular washer 58 is also in its extreme right-hand position and coil springs 144 and 146 hold the movable contact 88 of the reversing switch in engagement with stationary contact 84. The wiper blades are in parking position and are out of the normal line of vision of the occupants of the automobile.

If the ignition switch 168 is closed and it is desired to operate the windshield wiper, the manual switch is closed to shift the movable contact 160 into engagement with the stationary contact 158. This connects the battery with movable contact 88 and since this contact is now in engagement with stationary contact 84, the right-hand end of the field coil 116 is energized and the armature coil 178 is also energized. Energization of the field and armature coils of the motor produces rotation of the motor armature which drives the worm 14, worm wheel 16, shaft 18 and crank 20. This crank is connected through links 26 and 28 to the wiper blades and produces movement of these blades.

The initial rotation movement of the shaft 18 moves the high part 80 of the cam 74 out of engagement with lever 72, whereupon spring 54 returns tube 40, flange 66 and washer 62 to an intermediate position. This shaft to the left of the flange 66 permits movable contact 150 to engage stationary contact 148 and creates a parallel circuit connecting the battery with the movable contact 88 of the reversing switch, but since this contact is already in communication with the battery by way of the manual control switch, the closing of the automatic parking switch has no effect on the motor operation.

The left-hand movement of the annular washer 58 merely shifts the upper ends of the coil springs 144 and 146 to a point immediately above the pivotal point for the movable yoke 126. These coil springs in this position have no tendency to shift the movable contact of the reversing switch and this contact remains pressed against the stationary contact 84 by the spring 102. When the wiper blades approach the end of their stroke, the low point 76 of the cam 74 moves beneath the cam engaging part 72 of the lever 50 and permits the free end of this lever and the tube 40 to move to the extreme left-hand positions under the force of spring 54.

This further movement to the left of the tube 40 has no effect whatsoever on the automatic parking switch, which remains in closed position, as shown in Fig. 3. The upper ends of the coil springs 144 and 146 are now to the left of the pivotal points of the movable yoke 126, as shown in Fig. 3, and tend to move the lower end of this yoke to the left and thereby shift the movable contact 88 out of engagement with the stationary contact 84 and into engagement with the stationary contact 82 to reverse the direction of rotation of the motor 10. An important feature of my invention lies in the structural features which produce a snap action for shifting the movable contact 88 to reverse the direction of motor rotation. This contact was firmly held by the spring 102 in engagement with stationary contact 84 and could not be moved until the yoke 126 exerted a strong force thereon. The yoke fingers 128 and 130 are spaced apart a distance considerably greater than the width of the contact supporting block 90, so that the lower end of this yoke moves an appreciable distance before it starts to shift the block 90 and contact 88.

This means that the yoke 126 does not engage the block 90 until after the lower end of this yoke has acquired some momentum and the coil springs 144 and 146 are in a position to exert a strong shifting force on the block 90 and contact 88. This force must be more than sufficient to overcome the spring 102 which offers the greatest resistance while the movable contact 88 is still in engagement with a stationary contact. As the movable contact shifts toward midposition, the resistance of the spring 102 decreases and the force, which was sufficient initially to move the movable contact away from a stationary contact, becomes much greater than necessary to complete the shifting movement of the movable contact 88. As the latter passes its dead center position, the spring 102 assists in completing the movement. Completion of the shifting movement of the movable contact 88 is, therefore, assured under all conditions of operation and there is no possibility that this contact can stop in an intermediate position between the stationary contacts 82 and 84.

The reversing of the motor occasioned by shifting the movable contact 88 from engagement with stationary contact 84 into engagement with stationary contact 82, reverses the direction of oscillation of the wiper blades and the direction of rotation of the cam 74. This reversal of direction causes the middle portion 78 of the cam 74 to engage the lever 50 and shift the tube 40 to a midposition which is to the right of that shown in Fig. 3. This shift has no effect on the parking switch or the reversing switch. As the wiper blades approach the end of their normal range of movement, the high point 80 of the cam again engages the lever 50 to shift the control tube 40 farther to the right. This opens the parking switch and shifts the movable contact of the reversing switch. Since the manual control switch is closed, opening of the parking switch has no effect and the motor is reversed by the shifting of the movable contact 88 of the reversing switch.

This cycle of operations continues until the manual wiper control switch is opened by the automobile operator. Unless the manual switch is opened at the particular instant the parking switch is open, the motor continues to operate until the flange 66 is shifted to its extreme righthand position where it opens the parking switch. This completely disconnects the motor from the battery and prevents the motor from being reversed in the usual way by the simultaneous shifting of the movable contact of the reversing switch. The momentum of the motor armature and driving connections carries the wiper blades beyond their normal range of movement and into parking position outside of the normal line of vision of the automobile occupants.

In the embodiment of Figs. 1 to 8, inclusive, it is important that the automatic parking switch opens during the instant that the movable contact of the reversing switch is being shifted from one stationary contact to the other in order that the wiper blades be carried to parking position by the momentum of the operating parts of the wiper mechanism. If the parking switch opens too soon, the motor armature and associated parts will not have sufficient momentum to move the wiper blades the additional distance to parking position. Similarly if the parking switch opens after the reversing switch has reversed the motor circuits, the reduction in armature speed which immediately takes place will prevent the armature and associated parts from having sufficient momentum to carry the wiper blades to parking position. In the embodiment of my invention which I have just described, both the parking switch and reversing switch are operated by the same cam and by the same control tube and this feature contributes materially to the proper timing of the parking switch and reversing switch, but even with this arrangement the parts must be accurately made and adjusted to provide simultaneous operation of these switches.

In the modification of Figs. 9, 10 and 11, I have illustrated a form of my invention in which the parking and reversing switches operate at different times and substantially independently of each other, so that no close timed relationship in the operation of these switches is necessary. Except as herein differently shown and described, it is to be understood that the modification of Figs. 9, 10 and 11 may be identical with the embodiment of Figs. 1 to 8, inclusive. The principal differences between the modification of Figs. 9 to 11, inclusive, and the embodiment of Figs. 1 to 8, inclusive, lie in the electrical circuits and connections and in the different modes of operation resulting from these changes in circuit arrangements.

Referring to Fig. 9, it will be seen that the modification utilizes three electrical terminals 154, 172 and 200, whereas only the first two of these terminals were utilized in the first embodiment, as is most clearly shown in Fig. 4. In Fig. 4, the terminal 154 is connected both to the parking switch blade 148 and the reversing switch contact 86, whereas in Fig. 9 the terminal 154 is connected only to the parking switch blade 148. The movable contact 88 of the reversing switch is connected by electrical terminal 92' and wire 176' to the new terminal 200. The terminal 172 is connected to the other parking switch blade 150 as in the first embodiment.

The terminals 154, 172 and 200 are mounted in insulating strips 171' and 173' corresponding to the strips 171 and 173 of the first embodiment. The strip 173' is mounted in the recess provided in the wall of the housing 30' and the terminals project through openings in this wall and are spaced from contact with the wall to prevent short circuiting of these terminals. The terminal 92' is similar to the terminal 92, except that the wire-engaging tail of the terminal 92' extends in the opposite direction from the corresponding tail of the terminal 92. The operating mechanism for controlling the switches and circuits in the modification is the same as that shown in Figs. 1 to 8 of the drawings, except that the sleeve 68 (Fig. 3) is positioned slightly farther to the right to produce earlier opening and later closing of the automatic parking switch.

Referring to the wiring diagram of Fig. 11, it will be apparent that the lefthand end of the field coil 116 is still connected to the stationary terminal 82 of the reversing switch by wire 114. The righthand end of the field coil 116, however, is no longer connected directly to the stationary terminal 84 of this reversing switch. Instead the automatic parking switch and the manual control switch are interposed in parallel between this end of the field coil and the stationary contact 84 of the reversing switch. The movable contact 88 of the reversing switch is connected by conductor 176', terminal 200, and wire 202 to ignition switch 168 and battery 164.

A conductor 120' connects the righthand end of the field coil 116 with the contact 150 of the automatic parking switch and with the contact 160 of the manual control switch. A second conductor 156' connects the other contacts of these switches with the stationary contact 84. In this arrangement of the electrical circuits, neither the automatic parking switch nor the manual control switch has any effect on the operation of the windshield wiper when the movable contact 88 of the reversing switch is in the position shown in Fig. 11. The circuits and mechanism of the windshield wiper are so arranged that when the current is supplied to the lefthand end of the field coil 116, the wiper blades are moving toward the parking position. If both the manual control switch and the automatic parking switch are opened while the reversing switch is in the position shown in Fig. 11, the motor will continue to operate until the movable contact 88 of the reversing switch is shifted out of engagement with stationary contact 82, whereupon the supply of current to the motor will be completely cut off and the momentum of the motor armature and associated operating parts will move the blades into parking position.

In the modification of Figs. 9 to 11, inclusive, the operation is as follows. The movable contact 88 is in engagement with the stationary contact 84 when the windshield wiper is at rest and the automatic parking switch 148—150 is open. If the maunal control switch comprising the contacts 158 and 160 is closed and the ignition switch 168 is already closed, a circuit will be established between the battery and the righthand end of the field coil 116. This will energize the motor to move the wiper blades away from parking position. Since it is usual to park the wiper blades at the lower end of their stroke, this will be the upward stroke of the wiper blades. After the blades have moved upwardly a short distance, the automatic parking switch closes, but this has no effect on the electrical circuits, as this switch is in parallel with the closed manual control switch. As the blades approach the upper limit of their movement, the movable contact 88 is shifted from engagement with stationary contact 84 into engagement with stationary contact 82 to reverse the direction of rotation of the motor.

The wiper blades now start on their downward or return stroke. Shortly before these blades approach the lower limit of their normal range of movement, the automatic parking switch is opened, but this has no effect as it is located on an already open circuit. A brief interval after the opening of the parking switch, the reversing switch is shifted to bring movable contact 88 into engagement with stationary contact 84 and thereby reverse the direction of motor rotation. The blades then start their upward movement without passing below their normal operating range. Shortly after the direction of movement of the blades has been reversed, the automatic parking switch is again closed, but such closing of the parking switch is again without effect, since the manual control switch has remained closed.

This mode of operation continues until the manual control switch is opened. When the manual control switch is opened, the mechanism continues to operate until the movable contact 88 is shifted out of engagement with stationary contact 82 and into engagement with stationary contact 84. This shift, however, does not reverse the motor current, but serves merely to cut off this current completely since both the automatic parking switch and the manual control switch are open and the stationary contact 84 is no longer in electrical communication with the field coil 116. The momentum of the motor armature and associated parts thereupon moves the wiper blades below their normal range of movement and into parking position.

The automatic parking switch can be opened at any time during the downward movement of the wiper blades and closed at any time during the upward movement of these blades. I prefer, however, to open this switch only shortly before the shifting of the reversing switch and to close the automatic parking switch almost immediately thereafter in order to eliminate the possibility that the manual control switch may be opened between the shifting of the reversing switch and the closing of the parking switch. The timing relationship between the reversing switch and the parking switch, however, is not critical and any suitable timing relationship may be utilized.

The modes of operation of the illustrated embodiments are accomplished by simple and inexpensive mechanism which can readily be fabricated by inexpensive mass production methods. The parts of the mechanism can easily be made strong and sturdy and adjusted to give the desired range of wiper blade operation. The operating parts are enclosed in a housing which protects them against water, dirt and injury to provide long and trouble-free service.

While I have illustrated only two embodiments of my invention, it is to be understood that my invention is not limited to the particular details shown and described, but may assume various other forms and my invention is to be construed as including all modifications and variations falling within the scope of the appended claims.

I claim:

1. An electric windshield wiper having a wiper blade and comprising, in combination, a motor for driving said blade through a predetermined range of movement, means permitting said blade to move beyond said predetermined range to a parking position outside of said range, a reversing switch for said motor, a parking switch for said motor, snap-action means for operating said reversing switch, means for operating said parking switch only when said blade is in a predetermined position, said motor having an armature, driving means connecting said armature and blade, said blade and the movable parts connected thereto having sufficient momentum to move said blade from said predetermined position and into parking position outside of said range, and a single cam driven by said motor and controlling both of said switches.

2. In an electric windshield wiper having a wiper blade, a reversible electric motor for oscillating said blade in a predetermined range, a driving connection between said motor and blade, a housing, a reversing switch in said housing, an automatic parking switch in said housing, a support in said housing, a member slidable on said support to control said switches, a cam driven by said motor for moving said member, said reversing switch having a movable contact located between stationary contacts and alternately engageable therewith, a pivotal mounting for said movable contact, a spring for urging said movable contact against said stationary contacts and for resisting movement of said movable contact out of engagement with either of said stationary contacts, a movable element for shifting said movable contact and having one end engaging said contact, a pivotal support for the other end of said element, a spring connecting the first end of said element with said control member, said spring being shifted to opposite sides of the pivot for said element by said member to shift said movable contact with a snap action, means carried by said member for opening said parking switch when said wiper blade is in a predetermined position, said driving connection and motor including moving parts connected to said wiper blade and having sufficient momentum to move said wiper blade beyond its normal range of movement and into parking position beyond said range, and electrical circuits connecting said motor with said switches and with a suitable source of electrical energy.

3. In an electric windshield wiper having a wiper blade, a reversible electric motor for oscillating said blade in a predetermined range, a driving connection between said motor and blade, a reversing switch, an automatic parking switch, a member slidable to control said switches, a cam driven by said motor for moving said member, said reversing switch having a movable contact located between stationary contacts and alternately engageable therewith, a pivotal mounting for said movable contact, a spring for urging said movable contact against said stationary contacts and for resisting movement of said movable contact out of engagement with either of said stationary contacts, a movable yoke for shifting said movable contact and having one end engaging said contact, a pivotal support for the other end of said yoke, a spring connecting the first end of said yoke with said control member, said spring being shifted to opposite sides of the pivot for said yoke by said member to shift said movable contact with a snap action, means carried by said member for opening said parking switch when said wiper blade is in a predetermined position, said driving connection and motor including moving parts connected to said wiper blade and having sufficient momentum to move said wiper blade beyond its normal range of movement and into parking position beyond said range, and electrical circuits connecting said motor with said switches and with a suitable source of electrical energy.

4. In an electric windshield wiper having a wiper blade, a reversible electric motor for oscillating said blade in a predetermined range, a driving connection between said motor and blade, a reversing switch, an automatic parking switch, a tube slidable to control said switches, a cam driven by said motor for moving said tube, said reversing switch having a movable contact located between stationary contacts and alternately engageable therewith, a pivotal mounting for said movable contact, a spring for urging said movable contact against said stationary contacts and for resisting movement of said movable contact out of engagement with either of said stationary contacts, a movable yoke for shifting said movable contact and having one end engaging said contact, a pivotal support for the other end of said yoke, a spring connecting the first end of said yoke with said control tube, said spring being shifted to opposite sides of the pivot for said yoke by said tube to shift said movable contact with a snap action, means carried by said tube for opening said parking switch when said wiper blade is in a predetermined position, said driving connection and motor including moving parts connected to said wiper blade and having sufficient momentum to move said wiper blade beyond its normal range of movement and into parking position beyond said range, and electrical circuits connecting said motor with said switches and with a suitable source of electrical energy.

5. In an electric windshield wiper having a wiper blade, a reversible electric motor for oscillating said blade in a predetermined range, a driving connection between said motor and blade, a reversing switch for said motor, an automatic parking switch for said motor, a supporting stud, a tube slidable on said stud to control said switches, a cam driven by said motor for moving said tube, said reversing switch having a movable contact located between stationary contacts and alternately engageable therewith, a pivotal mounting for said movable contact, a spring for urging said movable contact against said stationary contacts and for resisting movement of said movable contact out of engagement with either of said stationary contacts, a movable yoke for shifting said movable contact and having one end engaging said contact, a pivotal support for the other end of said yoke, a spring connecting the first end of said yoke with said control tube, said spring being shifted to opposite sides of the pivot for said yoke by said tube to shift said movable contact with a snap action, means carried by said tube for opening said parking switch when said wiper blade is in a predetermined position, said driving connection and motor including moving parts connected to said wiper blade and having sufficient momentum to move said wiper blade beyond its normal range of movement and into parking position beyond said range, and electrical circuits connecting said motor with said switches and with a suitable source of electrical energy.

6. An electric windshield wiper having a wiper blade and comprising, in combination, a motor for driving said blade through a predetermined range of movement, a reversing switch for said motor, said reversing switch including an insulator carrying opposed stationary contacts, a block having a movable contact and shiftable to engage said movable contact with either of said stationary contacts, and a spring confined between said insulator and block to bias said movable contact toward either of said stationary contacts, a parking switch for said motor, means for operating said reversing switch, means for operating said parking switch only when said blade is in a predetermined position, said motor having an armature driving means connecting said armature and blade, said armature and driving means having sufficient momentum to move said blade beyond its normal range of movement and into parking position outside of said range, and cam means driven by said motor and controlling both of said switches.

7. In an electric windshield wiper of the class described, the combination of a wiper blade, a reversible motor for driving said blade, a first circuit for operating said motor in one direction, a second circuit for operating said motor in the opposite direction, a reversing switch controlling said circuits, a manual control switch in one of said circuits, an automatic parking switch in the same circuit as the manual control switch and arranged in parallel therewith, and means for operating said reversing switch and automatic parking switch in timed relation.

8. An electric windshield wiper of the class described, comprising a wiper blade, a reversible motor for driving said blade in opposite directions, said motor having a field coil, a reversing switch having a first contact connected to one end of said coil and a second contact connected to the other end of said coil, a manual control switch and an automatic parking switch arranged in parallel between one end of said coil and its associated contact, means for operating said reversing switch, and means for operating said parking switch in timed relation to said reversing switch.

9. An electric windshield wiper of the class described, comprising a wiper blade, a motor for oscillating said blade for normal operation, said motor having an armature connected to said blade and providing sufficient inertia to move said blade from operating position to a parking position beyond its normal operating range, an electrical circuit for driving said motor and blade in one direction, another electrical circuit for driving said motor and blade in the opposite direction, a manual switch in one of said circuits, and an automatic parking switch controlling said last named circuit only when said manual switch is open.

JOHN B. WHITTED.